US008557373B2

(12) United States Patent
Kubik et al.

(10) Patent No.: US 8,557,373 B2
(45) Date of Patent: *Oct. 15, 2013

(54) LAMINATE FOR PROTECTING METALS FROM CORROSIVE GASES

(71) Applicant: Northern Technologies International Corporation, Beachwood, OH (US)

(72) Inventors: Donald Kubik, Dickinson, ND (US); Barbara Nygaard, Circle Pines, MN (US)

(73) Assignee: Northern Technologies International Corp., Beachwood, OH (US)

(*) Notice: Subject to any disclaimer, the term of this patent is extended or adjusted under 35 U.S.C. 154(b) by 0 days.

This patent is subject to a terminal disclaimer.

(21) Appl. No.: 13/630,469

(22) Filed: Sep. 28, 2012

(65) Prior Publication Data

US 2013/0029120 A1 Jan. 31, 2013

Related U.S. Application Data

(62) Division of application No. 12/927,986, filed on Dec. 1, 2010, now Pat. No. 8,283,024.

(51) Int. Cl.
*B32B 7/02* (2006.01)
*B32B 27/18* (2006.01)
*B32B 27/32* (2006.01)
*B32B 27/34* (2006.01)
*B32B 27/08* (2006.01)

(52) U.S. Cl.
USPC ........... 428/220; 428/213; 428/500; 428/522; 428/520; 428/483

(58) Field of Classification Search
USPC ......................................... 428/220; 426/133
See application file for complete search history.

(56) References Cited

U.S. PATENT DOCUMENTS

| 4,289,830 A | * | 9/1981 | Knott, II | 428/475.8 |
| 5,281,471 A | | 1/1994 | Diete et al. | |
| 5,855,975 A | | 1/1999 | Miksic et al. | |
| 6,028,160 A | | 2/2000 | Chandler et al. | |
| 6,132,827 A | * | 10/2000 | Miro | 428/35.9 |
| 6,156,929 A | | 12/2000 | Chandler et al. | |

(Continued)

FOREIGN PATENT DOCUMENTS

| WO | 9111470 A1 | 8/1991 |
| WO | 9749870 A1 | 12/1997 |

OTHER PUBLICATIONS

FDA U.S. Food and Drug Adminstration, Listing of Food Additive Status Part I, A-G, pp. 1-16, http://www.fda.gov/Food/FoodIngredientsPackaging/FoodAdditives/FoodAdditiveListings/ucm091048.htm.

(Continued)

*Primary Examiner* — David Sample
*Assistant Examiner* — Tahseen N Khan
(74) *Attorney, Agent, or Firm* — Hudakm Shunk & Farine Co. LPA

(57) ABSTRACT

A corrosive gas resistant laminate comprises an outer polymer layer desirably containing a volatile corrosion inhibitor therein, a corrosion gas resistant barrier layer that can be a hydrophilic polymer, and a tie layer located between said outer and said barrier layers. The various laminates have improved transmission resistance with regard to corrosive gases such as oxygen, hydrogen sulfide, and halogen gases such as chlorine. The laminates can be used to protect metal during storage and transit.

18 Claims, 1 Drawing Sheet

(56) References Cited

U.S. PATENT DOCUMENTS

| | | |
|---|---|---|
| 6,224,957 B1 | 5/2001 | Crook et al. |
| 6,316,520 B1 | 11/2001 | Hekal |
| 6,617,415 B1 | 9/2003 | Miksic et al. |
| 6,787,065 B1 | 9/2004 | Schapira et al. |
| 7,087,277 B2 | 8/2006 | Yang et al. |
| 7,112,169 B2 | 9/2006 | Honstrater |
| 7,261,839 B2 | 8/2007 | Kubik et al. |
| 7,270,775 B2 | 9/2007 | Kubik et al. |
| 7,588,820 B2 | 9/2009 | Berg et al. |
| 2003/0026932 A1 | 2/2003 | Johnson et al. |
| 2004/0067375 A1* | 4/2004 | Rassouli et al. ............. 428/461 |
| 2004/0170780 A1 | 9/2004 | Giraud |
| 2004/0209021 A1 | 10/2004 | Shih |
| 2004/0234790 A1 | 11/2004 | Smith et al. |
| 2006/0099247 A1* | 5/2006 | Cantwell et al. ............. 424/451 |
| 2007/0275134 A1* | 11/2007 | Siegel et al. ................. 426/129 |
| 2009/0041963 A1 | 2/2009 | Kitahara |
| 2009/0151598 A1 | 6/2009 | Reinhard et al. |

OTHER PUBLICATIONS

FDA U.S. Food and Drug Adminstration, Listing of Food Additive Status Part II, H-Z, pp. 1-21, http://www.fda.gov/Food/FoodIngredientsPackaging/FoodAdditives/ucm191003.htm.

* cited by examiner

LAMINATE FOR PROTECTING METALS FROM CORROSIVE GASES

CROSS REFERENCE

This is a division of U.S. application Ser. No. 12/927,986, filed Dec. 1, 2010 for A LAMINATE FOR PROTECTING METALS FROM CORROSIVE GASES, which is hereby fully incorporated by reference.

FIELD OF THE INVENTION

The present invention relates to a corrosive gas resistant barrier laminate that resists penetration of corrosive gases such as oxygen, halogen gases, hydrogen sulfide, sulfur dioxide, HCl, $Cl_2$, and the like. The laminate comprises many different embodiments such as at least one outer layer desirably containing at least one volatile corrosion inhibitor, at least one corrosive gas resistant barrier layer that can be a hydrophilic polymer, and optionally one tie layer located between the outer layer and said corrosive gas resistant barrier layer. The laminate when applied to a metal as a layer thereon or as a wrap such as a bag provides synergistic protection against the above noted corrosive gases.

BACKGROUND OF THE INVENTION

Heretofore, various polymers or polymers containing a volatile corrosion inhibitor therein, and optional antioxidants either within the polymer or within a separate polymer layer, have been utilized as gas barrier films as for oxygen, sulfur dioxide, and hydrogen sulfide. The prior art also relates to various laminates that serve as a food wrap and contain an ethylene-vinylalcohol layer therein. The following documents represent a sampling of such prior art.

Various publications and patents relate to anti-corrosive material to protect various substrates such as metals, conduits, and the like from corrosion. Such articles include WO Publication 97/49870, U.S. Pat. No. 5,281,471, 5,855,975, 6,224,957, 6,316,520, 6,787,065, 7,261,839, 7,270,775, and U.S. Publication 2009/0151598.

BluGuard-VCI™ relates to an Anti-Corrosion Barrier Lamination With VpCI® Technology (Vapor Phase Corrosion Inhibiting Technology) generally in the form of a three-layer structure that sandwiches a foil barrier layer between an outer layer of clear PET and an inner sealant layer of VCI impregnated film.

Mitsubishi Gas Chemical Company produces a polyamide MXD6 that is a crystalline polyamide resin produced through the polycondensation of meta-xylene diamine (MXDA) with adipic acid under Mitsubishi Gas Chemical's technology. This polyamide resin can be utilized as a gas barrier film either alone or in combination with nylon, polyester, and the like.

Prior art that generally relates to biodegradable anti-corrosive laminates are set forth in U.S. Pat. Nos. 6,028,160, 6,156,929, and 6,617,415. Laminates that generally serve as packaging or food wraps are set forth in U.S. Pat. Nos. 4,289,830, 7,087,277, and 7,588,820.

Laminates that serve to protect various electronic components or products are set forth in U.S. Pat. No. 7,112,169 and U.S. Publication 2009/00151698.

Laminates that relate to absorbing harmful compounds are generally set forth in U.S. Publications 2004/0170780 and 2009/0041963.

SUMMARY OF THE INVENTION

A corrosive gas resistant laminate for protecting metal generally comprises at least one outer layer that can optionally but desirably contain a volatile corrosion inhibitor (VCI) therein, a corrosive gas resistant barrier layer with respect to the transfer of metal corrosive gases therethrough, and optionally but desirably a tie layer that binds the outer layer to the barrier layer. A five layer laminate contains an inner layer and an additional tie layer that, independently, can have the same or different compositions (e.g. polymer) as the initial outer and tie layer. The corrosive gas resistant laminates of the present invention can also contain multiple outer, multiple tie, or multiple corrosive gas barrier layers in various combinations so that the total number of layers can vary greatly. Yet another embodiment of the present invention relates to the use of an outer layer and an inner layer with a corrosive gas resistant barrier layer therebetween and no separate tie layers. The various laminates of the present invention have been found to yield synergistic results with respect to protecting metals from corrosive gases.

The present invention relates to a corrosive gas resistant laminate, comprising: at least one outer thermoplastic polymer layer optionally comprising a VCI therein; at least one corrosive gas resistant barrier layer; at least one optional tie layer that is compatible with said outer layer and said barrier layer; and said laminate being capable of protecting metals against corrosion.

The present invention further relates to a corrosive gas resistant laminate, comprising at least one corrosive gas resistant barrier layer; and at least one outer layer, said outer layer having at least one tie layer compound blended therein that is compatible with said outer layer material and said barrier layer.

DETAILED DESCRIPTION OF THE INVENTION

Figure 1:
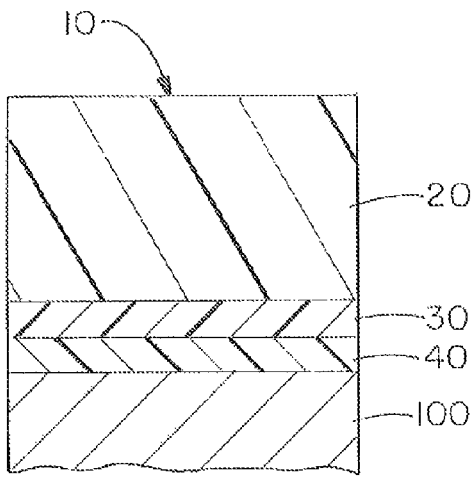
FIG. 1 is a cross sectional view of a three layer corrosive gas resistant laminate.
Figure 2:
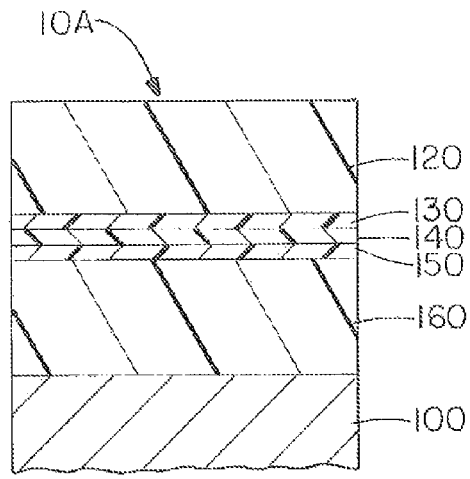
FIG. 2 is a cross sectional view of a five layer corrosive gas resistant laminate.
Figure 3:
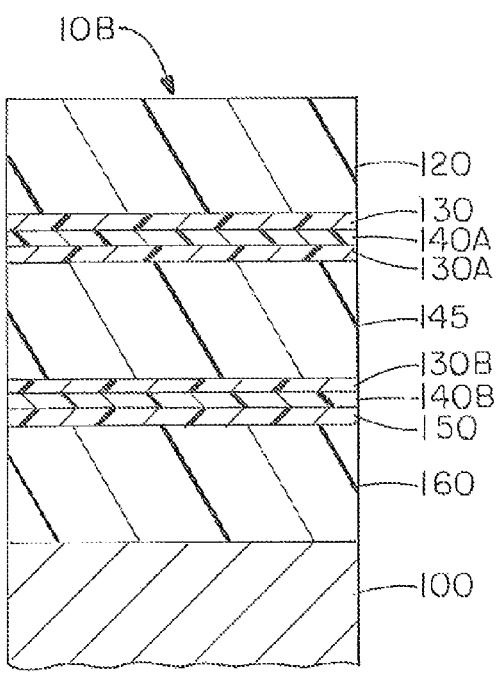
FIG. 3 is a cross-sectional view of a nine layer corrosive gas resistant laminate containing an outer and a middle layer, four tie layers, two corrosive gas resistant barrier layers, and one inner layer.
Figure 4:
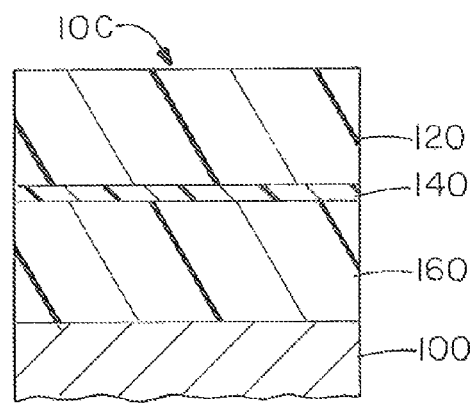
FIG. 4 is a cross sectional view of a three layer corrosive gas resistant laminate of the present invention containing an inner layer, an outer layer, with a corrosive gas resistant barrier layer therebetween.

One embodiment of the present invention is shown in FIG. 1 wherein corrosive gas resistant laminate 10 is used for protecting metal articles or substrates 100 from corrosion comprises outer layer 20 that is bonded to corrosive gas resistant barrier layer 40 by tie layer 30. According to another embodiment of the present invention, a corrosive gas resistant barrier laminate 10A comprises five layers as shown in FIG. 2. Layer 120 is a top outer layer that is bonded to corrosive gas resistant barrier layer 140 by tie layer 130. An inner layer 160 is also bonded to barrier layer 140 by second tie layer 150. Still another embodiment relates to a nine layer laminate 103 as shown in FIG. 3 wherein outer layer 120 and inner layer 160, are connected respectively by tie layers 130 and 150 to top corrosive gas barrier layer 140A and to bottom corrosive gas barrier layer 1403. A third so-called middle outer layer 145 is connected respectively by tie layer 130A to barrier layer 140A and on its remaining side by tie layer 130B to barrier layer 140 3. Yet another embodiment, is shown in FIG. 4 wherein three-layer laminate 100 comprises outer layer 120 and an inner layer 160, that are separately bonded to opposing sides of corrosive gas resistant barrier layer 140. Optionally, a tie layer is blended into the outer and/or inner layer. These and other embodiments within the ambit of the present invention are described hereinbelow.

It is an aspect of the present invention that whether the laminate of the present invention has three layers, five layers, or any other number of primary layers, each layer, independently, can comprise two or more sub layers, such as up to three, four, five, six, or eight total sub layers, wherein each sub layer, independently, can have the same or different compositions. Thus, numerous combinations of sub layers exist with regard to forming an individual overall layer such as a outer layer, a tie layer, or a corrosive gas resistant harrier layer.

The outer and inner layers of the multilayer films can be made out of many different types of polymer as set forth hereinbelow such as polyester, nylon, and the like, with polyolefins being preferred due to their low cost and good water and water vapor resistance and also since they comprise up to about 90% by weight of the total laminate weight. Still another aspect of the present invention is that the various outer and/or inner layers can be tailor made, depending upon the type of processing equipment available, by a particular manufacturer to reduce construction expenses of the various laminates. For example, extrusion equipment can be utilized, or multilayer cast lines can be utilized, or blown multilayer lines can be used to make the corrosion gas resistant laminates. Thus, inner and/or outer layer polymers are utilized that are 1) suitable stable thermoplastic resins (petroleum or bio-based) which can produce blown or cast multilayer film; and 2) that possess the required physical properties, i.e. strength, puncture resistance, UV resistance, tear resistance, cost, temperature resistance and other required barrier properties.

The properties of the inner and/or outer layer are desirably not affected by the various corrosive gases and in a preferred embodiment contain a volatile corrosion inhibitor (VCI). In addition to the VCI or as an alternative embodiment, the outer and/or inner layer can contain various other functional additives such as various biocides, various antistats, various flame-retardants, various colorants, and various scavengers, or any combination thereof. These additives allow for the preparation of a corrosive gas resistant laminate that can be tailor made to fit a variety of circumstances or situations as set forth hereinbelow. Should the outer or inner layer not effectively bond directly to the barrier layer, it is desirable to use a tie layer as noted hereinabove. The tie layer has adhesive properties and can be a wide range of materials such as an organic compound, for example a resin, or an inorganic compound, but desirably is a synthetic compound such as one or more different polymers.

The one or more outer and/or inner layers comprise one or more thermoplastic polymers often having hydrophobic properties such as a polyolefin, e.g. polyethylene, low density polyethylene, high density polyethylene including high molecular weight and ultra high molecular weight polyethylene, polypropylene and copolymers thereof, copolymers of polyethylene including ethylene-ethyl acrylate copolymers and ethylene-methyl acrylate copolymers; one or more polymers derived from dienes such as copolymers of acrylonitrile-butadiene-styrene (ABS), copolymers of polybutadiene, or polychloroprene, and copolymers of butadiene and styrene; polystyrene or methyl methacrylate-styrene; one or more halocarbon containing polymers or copolymers such as poly-chlorotrifluoroethylene, polytetrafluoroethylene, fluorinated ethylene polypropylene copolymer, polyvinylchloride, polyvinylidene chloride, polyvinylidene fluoride, and blends of polyethylene and polytetrafluoroethylene; heterochain thermoplastic such as polyaryletherketone copolymers of melamine formaldehyde; various polysulfides; various polyphthalamides; thermoplastic polyurethanes; various polyamides such as Nylon 6-6, or 6-10; various polyesters such as polyethylene terephthalate; or any combinations of the preceding. Preferred outer and/or inner layer polymers include polyolefins and copolymers as well as derivatives thereof, and bio-source or petroleum-based polyesters and polyamides. A highly preferred outer polymer is polyethylene and the various low or high density variations thereof since the same are strong, economical, have good corrosion resistance, and have good puncture resistance. The various polyethylenes are also preferred in situations where good water and/or water vapor resistance is desired as in humid environments since they have relatively low water vapor transmission rates (WVTR). Other desirable low WVTR polymers include hydrophobic-type polymers, other polyolefins and various rubbers and thus the amount of any blended hydrophilic polymers such as polyesters is kept low or avoided. That is the amount of any such hydrophilic polymers blended with a polyolefin type or a polymer derived from a diene is generally less than about 10 parts by weight, desirably less than about 5 parts by weight, desirably less than about 2 parts by weight, and very preferably nil, that is contains no hydrophilic compound per every 100 parts by weight of the outer and/or inner layer polymer.

The thickness of the total of all inner and outer layers is generally from about 65% to about 93% of the total thickness of the corrosive gas resistant laminate. Thus, the thickness of an individual outer layer or an individual inner layer will vary depending upon the total number of outer and inner layers within a laminate. With respect to a five layer laminate, as set forth in FIG. 2, the thickness of the outer layer as well as the thickness of the inner layer, independently, will be from about 0.8 to about 22 mils and desirably from about 1.0 to about 1.9 mils. Of course, depending upon desired end use, the total thickness of the corrosive gas resistant laminate, regardless of the number of layers therein, can vary greatly. Alternatively, the total weight of the inner and/or outer layers can range from about 65% to about 93% and desirably from about 70% to about 90% by weight of the total weight of the corrosive gas resistant laminate.

The above-noted outer and/or inner layer additives such as biocides, antistats, flame retardants, scavengers, and colorants are utilized to improve specific properties of the laminate. The amounts of such additive will vary depending upon the effectiveness thereof as well as the desired end result and such amounts are generally known to the art and to the literature, or can be readily determined.

Biocides can generally be any compounds that inhibit the growth or kill various microorganisms such as bacteria, molds, fungi, and the like. Suitable biocides include various chlorinated hydrocarbons, organometallic compounds, halogen-releasing compounds, metallic salts, organic sulfur compounds, quaternary ammonium compounds, phenolics, zinc pyrithione, and the like. Such biocides can be compounded as a concentrate and added to inner and/or outer layer. Art example of an inorganic antimicrobial compound is RTP Company MC X122009, a silver powder containing masterbatch, that possesses relatively high heat stability and low volatility. It reduces the chance of microbe adaptation and provides long lasting effectiveness. The Ag loading can vary from 0.10% to 1.0%. A biocide that is effective in combating both fungi and bacteria is ABF® made by Akcros Chemicals America of New Brunswick, N.J. that contains OBPA, i.e. oxybisphenoxarsine. A bactericide, example is Intercide® ZnP that contains zinc pyrithione. A fungicide example is Intercide IPBC, based upon 3-iodo-2-propynyl butyl carbamate. These two intercide compounds are made by Akcros Chemicals America.

Various antistat additives can be used and include electrically-conductive polymers such as compounds that migrate to the surface of a plastic or polymer and modify its electrical properties, e.g. various fatty quaternary ammonium compounds, fatty amines, and the like such as GMS (glycerol monostearate), ethoxylated fatty acid amines, and dimethanolamines, and the like. Other antistatic additives include hygroscopic compounds such as polyethylene glycols and the like. The antistatic additives can also be generally classified as nonionic compounds. Internal antistats have the advantage of providing a certain minimum level of static dissipation regardless of environmental humidity because the additives themselves are conductive. Other commonly available antistats include conductive carbons, metalized fibers and conductive carbon fibers.

Flame retardant agents are known to the literature and to the art and generally include inorganic salts such as ammonium sulfamate, zinc borate, antimony oxychloride, and the like. The amount of such additives generally vary depending upon the end use and thus can range from about 1 or 2 parts by weight to about 3 or about 10 parts by weight for every 100 parts by weight of the inner or outer layer of polymers.

Examples of scavengers include various alkali metal silicates, zinc oxide, and combinations thereof. The scavengers are desirably anhydrous, meaning that the outer layer or inner layer polymer composition is not hydrolyzed to more than 5 weight percent under conditions at which an object to be protected is stored in the corrosive gas resistant laminate. The amount of the anhydrous scavenger when utilized is from about 0.01 percent to about 5 percent by weight based upon the total weight of the corrosive gas resistant outer or inner layer.

Various colorants or processing aids additives can be utilized in the laminates of the present invention. The dyes and/or pigments are utilized to impart a desired color to any layer or the overall laminate. Suitable dyes that are known to the art and to the literature can be utilized such as titanium dioxide, carbon black, red iron oxide, and the like. Processing aids include various lubricants, release agents, and fillers slip additives, and the like that are well known to the art and to the literature are also useful.

The volatile corrosion inhibitors (VCI's) of the present invention that are preferably utilized in the outer and/or inner layers are known to the art and to the literature and generally include various triazoles and derivatives thereof such as benzotriazole and tolytriazole; various benzoates such as ammonium benzoate and cyclohexylammonium benzoate; various salts of benzoic acid; various carbonates, various carbamates; various phosphates; various alkali metal molybdates such as sodium molybdate, various dimolybdates such as ammonium dimolylbdate, various amine molybdates such as aliphatic or aromatic amine having a total of from about 3 to about 30 carbon atoms, or a salt thereof; and various alkali dibasic acid salts such as set forth in U.S. Pat. Nos. 4,973,448; 5,139,700; 5,715,945; 6,028,160; 6,156,929; 6,617,415; and 6,787,065, hereby fully incorporated by reference. Useful VCI's of the present invention preferably include various organic nitrites such as dicyclohexylammonium nitrite and triethanolammonium nitrite, or alkali metal nitrites such as potassium nitrite with sodium nitrite being preferred. The VCI can be added to the inner and/or outer layer by various conventional methods such as by blending it with a melted polymer, e.g. polyethylene. The amount of VCI within these layers is generally from about 0.25 to about 10 parts by weight, desirably from about 0.3 to about 6.0 parts by weight, and preferably from about 0.4 to about 3.0 parts by weight per 100 total parts by weight of the inner and/or outer polymer layers.

With respect to the various VCI components that have been set forth hereinabove, in order to limit the amount thereof that are released by the outer and/or inner layer polymer over a specific period of time and form a coating on the metal to be protected against corrosion, such VCI components can be blended with various structuring compounds comprising at least one solid or pasty substance having a melting point range of from about 40 to about 100° C. and preferably from about 50 to about 90° C., or a liquid substance that is capable of forming when mixed with a mineral filler a solid or pasty combination. Examples of suitable structural compounds, liquid substances, and mineral fillers are set forth in U.S. Pat. No. 6,787,065 which is hereby fully incorporated by reference and include various waxes such as carnauba wax, bees wax, paraffin wax, microcrystalline wax, petrolatum, polyethylene wax oxidized microcrystalline wax, and polyethylene glycol 4000, and combinations thereof. The amount of the one or more VCI components is generally from about 1 to 90% and preferably from about 20 to about 60% by weight and the amount of the one or more structuring agents is from about 10 to about 99% by weight, and preferably from about 40 to about 80% by weight based upon the total weight of all VCI compounds and all structuring compounds.

Another group of vapor phase corrosion inhibitors of the present invention that can be utilized to protect a broad range of metals such as iron, aluminum, copper, nickel, tin, chromium, zinc, magnesium, and alloys thereof as set forth in US Pub, 2009/0151598 are hereby fully incorporated by reference, and generally comprise (1) at least one $C_6$ to $C_{12}$ aliphatic monocarboxylic acid, (2) at least one $C_6$ to $C_{12}$ aliphatic dicarboxylic acid, and at least one (3) primary aromatic amide. Preferably the composition also comprises at least one (4) aliphatic ester of hydroxybenzoic acid such as 4-hydroxybenzoic acid, and/or at least one (5) benzimidazole, especially a benzimidazole substituted on the benzene ring. The amount of component (1) is from about 1 to about 60% by weight, the amount of component (2) is from about 1 to about 40% by weight, the amount of the (3) component is from about 0.5 to about 20% by weight, the amount of the (4) component is from about 0.5 to about 20% by weight, and the amount of the (5) component is from about 5 to about 20% by weight. When utilized, this hydrophobic composition will apply a thin protective layer or film on the metal substrate or article to be protected. The amount of these inhibiting substances set forth in U.S. Patent Publication No. 2009/0151598 that can be utilized in the outer and/or inner layer is generally from about 0.25 to about 5.0 or about 10 parts by weight and desirably from about 0.2 to about 2.0 parts by weight for every 100 parts by weight of the one or more outer and/or inner layer polymers.

The corrosive gas resistant barrier layers of the present invention can be hydrophilic and include various polyamides and polyamide copolymers with crystalline polyamides being preferred such as various MXD6 nylons from Mitsubishi Gas Chemical Company, Inc. Amorphous polyamides, e.g. made by DuPont can also be utilized. Copolymers of polyamides can also be utilized such as Nylon 610 and 612. A preferred polyamide copolymer is Nylon MXD6 which is polycondensation of meta-xylene diamine (MXDA) with adipic acid. This nylon copolymer has been found to have superior gas barrier properties such as with respect to oxygen and carbon dioxide, low water absorption, a high glass transition temperature, high tensile and flexural strength and modulus as well as excellent gas barrier properties. Blends of polyamides and polyamide copolymers can be utilized with other polymers such as polyvinyl alcohol or polyethylene-vinyl alcohol. A blend of an amorphous nylon with a polyethylene-vinyl alcohol resin is Selar® PA 2072 made by DuPont wherein the amount of the amorphous nylon can generally range from about 10.0% to about 60% and desirably from about 20.0% to about 40% by weight based upon the total weight of the amorphous nylon and the polyethylene-vinyl alcohol.

Other corrosive gas resistant barrier layers include polyvinyl acetate and copolymers thereof or blends thereof with another polymer.

Preferred barrier layer polymers also include polyvinyl alcohol or copolymers thereof such as polyolefin-vinyl alcohol wherein the olefin has from 2 to 6 carbon atoms, and blends thereof with other polymers such as ethylene or propylene can also be used. Examples of polyvinyl alcohol polymers include Eval E® made by Kuraray of Japan, Eval F® also made by Kuraray of Japan, and Soarnol D® sold by Nippon Gohsei of Japan. Copolymers of polyvinyl alcohol with ethylene are highly preferred. The amount of ethylene in the copolymer is generally from about 30 to about 45 mole %, desirably from about 34 to about 42 mole %, and preferably about 36 to about 40 mole % with the vinyl alcohol mole content being the remaining, that is from about 55 mole % to about 70 mole %, desirably from about 58 to about 66 mole %, and preferably from about 60 to about 64 mole %. A suitable ethylene-vinyl alcohol copolymer is Soarnol ET3808 made by Soarnus LLC that contains 38 mole % of ethylene and 62 mole % of vinyl alcohol.

Another preferred corrosive gas resistant barrier layer is made from carbon monoxide copolymer or interpolymers with either vinyl alcohol homopolymers or olefin-vinyl alcohol copolymers such as ethylene-vinyl alcohol copolymers. Such polymers are set forth in WO 01/11470 which is hereby fully incorporated by reference with regard to all aspects thereof including ratios and weight amounts of the ethylene-carbon monoxide copolymer and the polyvinyl alcohol copolymer, and the like.

Another desired barrier layer material of the present invention is polyvinylidene chloride and copolymers thereof with vinyl chloride, acrylonitrile, or acrylates, as for example a copolymer of vinylidene chloride and methyl acrylate such as XU 32019.L from Dow.

The above barrier materials minimize the permeation of oxygen, water vapor and odors. These barrier layer materials can be used in the design of multi-layer blown films or alternatively, can be extruded.

The corrosive gas barrier layer instead of preferably being one layer can be made of various sub-layers wherein each sub-layer, independently, can be of the same or a different polymer as those set forth hereinabove. The total thickness of a preferred single corrosive gas barrier layer of a laminate as set forth in FIG. 2 will vary depending upon the thickness of the overall laminate, but is generally from about 0.1 to about 0.6 mil, and desirably from about 0.2 to about 0.4 mil, for a corrosive gas resistant barrier laminate having a total thickness of about 4 mils. Alternatively, the total weight of the corrosive gas resistant barrier layer can range from about 2 or 3 wt. % to about 8 or 10 wt. % based upon the total weight of the laminate.

The corrosive gas resistant barrier layer of the present invention can optionally but desirably contain small amounts of a phenol additive and preferably an ortho-substituted phenol generally having a melting point below about 200° C. While numerous phenol compounds exist as set forth in U.S. Pat. No. 4,289,830 hereby fully incorporated by reference, the following compounds are desired, 2-hydroxy-4-octoxybenzophenone, 2-hydroxy-4-methoxybenzophenone, 2,4-dihydroxybenzophenone, octyl 3-(3',5'-di-t-butyl-4'-hydroxy) phenyl propionate, 2(2'-hydroxy-3',5' di-tert-amyl)phenylbenzotriazole, tertiary butyl salicylate, t-butylhydroquinone, and any combination thereof. The amount of the phenol compound in the corrosion gas barrier layer such as a copolymer of ethylene and vinyl alcohol copolymer generally ranges from about 0.5 to about 10, desirably from about 0.7 to about 5, and preferably from about 0.8 to about 2 or 3 parts by weight based upon 100 total parts by weight of the hydrophilic or corrosion gas resistant barrier layer.

A tie layer can be utilized to bond the corrosive gas barrier layer to the outer and/or inner layer. Thus, the tie layer is desirably compatible with the outer and/or inner layer as well as the barrier layer. As used in this specification, "compatible" means that a particulate layer will adhere or bond to an adjacent layer and not easily separate therefrom. Thus, tie layer materials or polymers are utilized that readily adhere to an adjacent barrier layer as well as to an adjacent outer or inner layer. If the outer and/or inner layer is a hydrophobic layer such as polyethylene or a rubber, hydrophilic polymers are avoided for the tie layer inasmuch as they are incompatible therewith. The tie layer can be a preferred single layer, or two more sublayers. Tie layers of the present invention are desirably polymers and include various acrylate and methacrylate polymers wherein the ester portion can contain from 1 to about 12 carbon atoms. Blends of the various acrylates with polyolefins can also be utilized. The tie layer can also comprise polymeric anhydride such as polymers of maleic anhydride optionally having a substituted alkyl group (e.g. $C_1$-$C_{10}$) or a substituted aryl group or a substituted alkyl aromatic group with the alkyl having from 1 to about 5 carbon atoms. Modified polymers, e.g. copolymers of an anhydride or of maleic anhydride with olefins such as ethylene or propylene, or with ethylene vinyl acetate, or with ethylene acrylate can also be utilized.

Specific examples of tie layers include anhydride chemically modified polyethylene such as Admer NF 908A (Mitsui Chemical), anhydride chemically modified low density polyethylene such as Bynell 4208 (DuPont), or anhydride chemically modified linear low density polyethylene such as Plexar® PX3236 made by Equistar. These copolymers generally contain from about 30 to about 40 mole percent olefin. Of course, generally any type of polyolefin can be utilized that is modified by maleic anhydrides such as high density polyethylene, low density polyethylene, etc.

The total thickness of each of the two single tie layers as set forth in FIG. 2, independently, is from about 0.1 to about 0.6 mils, and desirably from about 0.2 to about 0.4 mils, based upon a corrosive gas laminate having a total thickness of about 4 mils. Alternatively, the total weight of the one or more tie layers can be from about 5 to about 20%, and desirably from about 7% to about 18% by weight based upon the total weight of the corrosive gas resistant laminate.

According to another embodiment of the present invention, while the tie layer can generally be a separate layer as shown in the embodiment of FIGS. 1, 2, and 3, it can be blended, as by calendering or extruding, with the inner and/or outer layers 20, 40, 120, 145, or 160 of FIGS. 1, 2, and 3. That is, in order to reduce the number of processing operations, the components of the inner/outer layer and the tie layer can be melt blended to form generally one uniform or homogeneous outer-tie layer. In this situation, the embodiment of FIG. 1 would only have two layers, the blended outer layer 20 and the barrier layer 40, whereas in the embodiment of FIG. 2 would have only three layers, i.e. outer layer 120 and inner layer 160 separated by an intermediate corrosion gas resistant barrier layer 140. The embodiment of FIG. 2 wherein the tie layer is blended with the outer and the inner layer is shown in FIG. 4. Alternatively, the embodiment of FIG. 4 need not contain any tie layer blended therein so long as the inner and outer layer is compatible with barrier layer 140, but the same is generally not preferred.

Figure 5:
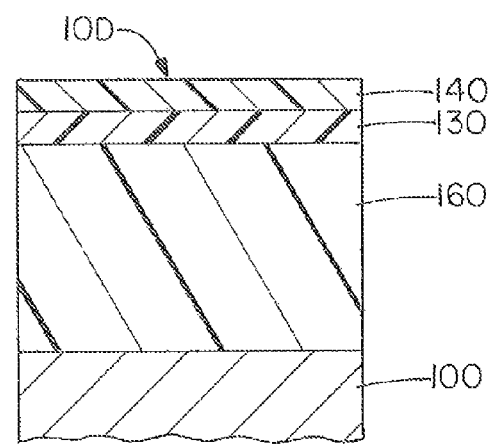
FIG. 5 is a cross sectional view of a three layer corrosive gas resistant laminate of the present invention wherein a corrosive gas resistant barrier layer is an outer layer.

While desirably and preferably the outer and/or inner layers are located respectively on the outer side of the laminate or on the inner or metal facing side of the laminate, the corrosive gas resistant barrier layer can be located on the outside of the laminate with an inner layer being located on the side of the laminate that is adjacent, contacts, or spaced apart from a metal object or article to be protected against corrosive gases. Such an embodiment is shown in FIG. 5. FIG. 5 is thus representative of the corrosion gas resistant laminate of the present invention wherein the one or more layers of the corrosive gas resistant barrier is located on the outside of the laminate with one or more inner polymer layers located on the inside of the laminate. As with the above embodiments, the use of a tie layer is optionally, but generally desired. The tie layer can be one or more separate layers 130 as shown in FIG. 5, or the tie layer can be blended with inner layer 160. The embodiment of FIG. 5 is generally not desired since it is preferred to have a polymeric water resistant layer located on the outside of the laminate with the barrier layer desirably located adjacent to or in contact with the metal part to be protected in FIG. 1. With regard to the thicknesses of the various layers of the embodiment of FIG. 5, they are as set forth below. That is, the total thickness of the one or more inner layers is by far the thickest amount of a laminate, with the total of one or more corrosive gas resistant barrier outer layer being very thin in comparison as is the one or more tie layers based upon the total thickness of the corrosive gas resistant laminate.

An alternative aspect of the present invention that in addition to the three layer embodiment of FIG. 1 or the five layer embodiment of FIG. 2, numerous other embodiments exist that contain one or more additional inner and/or outer layers, or one or more additional corrosive gas resistant barrier layers, and/or one or more additional tie layers desirably located between the additional inner and/or outer layers and the additional corrosive gas barrier layer. In such embodiments, the so-called outer layer can reside within the laminate, e.g. a middle layer and not be located on an external surface thereof; see FIG. 3. Also, the embodiments of FIGS. 1 and 2 can, independently, contain one or more additional inner and/or outer layers that are bound by a tie layer to an adjacent barrier layer or, alternatively, one or more hydrophilic or barrier layers that are bound desirably by a tie layer to an adjacent outer or inner layer. Thus, the number of so-called laminate possibilities or embodiments is exceedingly large. For example, the total number of laminate layers can range up to about 8, up to about 10, or up to about 15, and so forth. It is further noted that in all of these embodiments the additional one or more outer and/or inner layers, one or more tie layers, and/or one or more corrosion gas resistant barrier layers can independently, be the same or different type of compound or polymer, respectively, as any other outer and/or inner layer, tie layer, or corrosive gas barrier layer.

As a specific example of a laminate embodiment of the present invention, reference is made to FIG. 2. Outer layer 120 is made of polyethylene and is approximately 40% by weight of the total weight of the five layer laminate. Tie layer 130 is an ethylene-anhydride copolymer, or an ethylene chemically modified anhydride copolymer and is approximately 6% by weight of the total laminate weight. Center or barrier layer 140 is polyethylene-vinyl alcohol copolymer containing about 30 to about 40% by weight of ethylene repeat units therein. The barrier layer is approximately 6% by weight of the total weight of the laminate. Tie layer 150 is the same type of polymer of tie layer 130 and also is approximately 6% by weight of the total weight of the laminate, and inner layer 160 is a polyethylene layer and is approximately 40% by weight of the total weight of the laminate. With regard to outer layer 120, it preferably contains about 2% by weight of a VCI that is e.g. sodium nitrite.

With respect to additives, a flame retardant such as decabromodiphenyl ether can be used in the inner and/or outer layers 160 and 120. The outer layer 120 can contain a colorant as well as an antistat such as glycerol monostearate. Optional conductive fillers can also be contained in outer layer 120 that serve as an antistat agent such as Ampacet 101140. Additionally, an antimicrobial or biocide agent such as MCX122009 can be utilized that is available from RTP Company of Winona, Minn., that contains silver.

Inner layer 160 can also contain a VCI, a flame retardant, a colorant, and a scavenger such as noted above.

The overall thickness of the various corrosive gas resistant laminates of the present invention can vary largely depending upon the substrate or article it is to cover, wrap, contain, etc., but generally can range from about 0.6 mil to about 10.0 mil, desirably from about 0.8 mil to about 6.0 mil, and preferably from about 1.0 mil to about 5.0 mils. Based upon a total laminate thickness of 100%, the total thickness of the one or more outer and/or inner layers is by far the largest ranging from about 65% to about 92%, desirably from about 70% to about 90% and preferably from about 80% to about 85%. The total thickness of one or more tie layers is from about 3% or 5% to about 20%, desirably from about 7% to about 18% and preferably from about 9% to about 15%. The total thickness of the one or more barrier layers is from about 2% to about 15%, desirably from about 3% to about 10%, and preferably from about 4% to about 8%. When the tie layer compounds are blended with either the inner and/or outer one or more layers, the total thickness of the blended outer and/or inner layers is from about 75% to about 98%, desirably from about 80% to about 97% and preferably from about 90% to about 96% based upon the total thickness of the laminate, with the difference being the total thickness of the one or more barrier layers.

The corrosive gas resistant laminates of the present invention such as set forth in FIGS. 1, 2, 3, and 4 comprise one or more polymers that resist the penetration of corrosive gases therethrough. Corrosive gases include oxygen, halogen gases such as chlorine and bromine, hydrogen sulfide, sulfur dioxide, HCl vapors, and the like. Metals that can be protected by the corrosive gas resistant laminates of the present invention include iron, steel, aluminum, copper, nickel, tin, zinc, chromium, magnesium, silver, and the like, as well as alloys thereof. The corrosive gas resistant laminates of the present invention unexpectedly have large improvements with regard to resisting penetration of corrosive gases therethrough. For example, the laminates generally exhibit a penetration of about 10% or less, desirably about 5% or less, and preferably about 1% or about 0.1% or less with respect to various corrosive gases as that compared to plain polyethylene of equal thickness with respect to permeation per unit, time, and area. In different terms, the corrosive gas resistant laminates of the present invention have unexpected and synergistic reductions with respect to oxygen transmission rates of less than about 1.0, desirably less than about 0.5 and preferably less than about 0.1 or less than about 0.05 cc/100 in$^2$/day. With respect to H$_2$S permeation transmission rates the value was less than about 200, desirably less than about 100, and preferably less than about 50 cc/100 m$^2$/day.

An important aspect of the present invention is that the various polymers utilized either in the inner and/or outer layers, the tie layers, and the corrosive gas barrier layers do not decompose and do not permit moisture and/or the corrosive gases to attack the metal. Thus, the laminates of the present invention are generally free of biodegradable polymers such as various polyesters that are known to the art and to the literature, for example polylactate. That is, if the laminates do contain biodegradable polymers, they are utilized in small amounts such as less than about 5 parts by weight, desirably less than about 2 parts by weight, and preferably be nil, that is the individual layers are free and do not contain any biodegradable polymers therein based upon 100 total parts by weight of the total laminate weight.

Fillers are generally not desired especially those that reduce the elongation of the laminates since the same can result in formation of cracks, tears, cuts, etc., that reduce the resistance to the penetration of corrosive gases and can lead to openings that will readily permit the corrosive gases to attack the various metals. Mineral fillers such as clays, chalks, carbonates, talcs, nano-clays, silica, and the like are thus avoided. That is, the various individual layers of the laminate contain generally less than about 5 parts by weight, desirably less than about 2 parts by weight, and preferably are free of, i.e. contain no parts by weight of any such fillers per 100 parts by weight of total polymers in the laminate.

The preparation of the corrosive gas resistant laminates of the present invention can generally utilize commercial methods, for example coextrusion, calendering, and utilize commercial blown multilayer equipment or cast multilayer equipment, and the like. Two such methods are set forth as follows.

The polymers or resins of the outer and/or inner layers including optional tie layer components therein are added to a gravimetric additive feeder. Such polymers, as noted above, include low density polyethylene, polypropylene, high density polyethylene and the like. These polymers can be fed into existing material streams or combined with a weight throughput monitor hopper. This process ensures even layer thicknesses. The screw speed is controlled via a weight reduction of the weighing hopper.

Additional optional additives such as Vas, antiblock, antisat, hydrophobic, colorants, processing aids, are combined by using either volumetric or weight loss feeding gravimetric techniques. Microprocessors are used to monitor the amount of material fed into mixing chambers.

A central blending station was used to pre-blend additives and resins. These resins and additives are accurately weighed and added to a spinning cylinder with mixing blades to uniformly distribute the additives and polymers.

With regard to a co-extrusion process, the various outer and/or inner layers as well as the optional tie adhesive layer compounds can be pre-blended and added to the gravimetric feeders that feed the extruders which produce the inner and outer layers. Barrier resin or polymers are added to the core or middle extruder. The extruders delivered a steady volumetric throughput of different viscous liquids to a single extrusion die. This process welds together the various layers by keeping them separate. The layer thicknesses are controlled by the speed and individual extruders delivering the material.

With respect to a general blown film extrusion process, the measured outer and/or inner polymers or resins are introduced into the extruder. The melted (liquid) material is pushed (pumped) under continuous pressure, through a circular die to form a thin walled tube. Air is introduced in the middle of the die to blow the tube. The film is cooled by using an air ring mounted at the top of the die. The blown film tube is flattened through nip rollers and forms a lay flat tube which passes through rollers. Various tubing or sheeting forms can be converted into bags by heat sealing across the width of the film. Converted bags can be perforated on a roll or individually cut.

The present invention will be better understood by reference to the following examples which serve to illustrate, but not to limit the present invention.

Two Controls were prepared as well as two Examples according to the present invention. Control 1 merely related to a 100% low density polyethylene film having a total thickness of 4 mils. Control 2 utilized a commercial product, that is. Zerust® made by NTIC of Circle Pines, Minn., also having a total thickness of 4 mils. Control 2 was a 100% low density polyethylene layer but also contained approximately 0.5 weight percent of a volatile corrosion inhibitor, i.e. sodium nitrite and approximately 0.5 wt. % of butylated hydroxy toluene, (BHT). Example 1 was a five layer laminate of the present invention similar to that shown in FIG. 2 containing as the tie layers a copolymer of ethylene-maleic anhydride and as the corrosive gas barrier layer a copolymer of ethylene-vinyl alcohol. The total thickness of Example 1 was 4 mils and it did not, contain any volatile corrosion inhibitor. Example 2 was a laminate of the present invention essentially identical to that of Example 1 except that one or both of the outer hydrophobic layers each contained approximately 0.5% by weight of sodium nitrite VCI. A description of the layers of the two Controls and two Examples are set forth in Table 1.

TABLE 1

| | Type of Layer | Composition | Thickness |
|---|---|---|---|
| Control 1 | Hydrophobic layer | 100% low density polyethylene | 4 mil |
| Control 2 | Hydrophobic layer | 100% low density polyethylene 0.5 wt. % sodium nitrite 0.5 wt. % BHT (2,6-T-butyl-4-methyl phenol) (an antioxidant) | 4 mil |
| Example 1 | Outer layer | 100% low density polyethylene | 41.0% |
| | Tie Layer | Ethylene-anhydride copolymer Plexar ® PX3236 | 6.0% |
| | Corrosive Resistant Gas Barrier Layer | Ethylene-vinyl alcohol copolymer (38 mole %) (62 mole %) | 6.0% |
| | Tie Layer | ethylene-anhydride copolymer Plexar ® PX3236 | 6.0% |
| | Inner Layer | 100% low density polyethylene | 41.0% |
| Example 2 | Hydrophobic layer | 100% low density polyethylene ___0.5___ wt. % of sodium nitrite | 41.0% |
| | Tie Layer | ethylene-anhydride copolymer Plexar ® PX3236 | 6.0% |
| | Corrosive Resistant Gas Barrier Layer | Ethylene-vinyl alcohol copolymer (38 mole %) (62 mole %) | 6.0% |
| | Tie Layer | ethylene-anhydride copolymer Plexar ® PX3236 | 6.0% |
| | Hydrophobic Layer | 100% low density polyethylene | 41.0% |

Total thickness of Examples 1 and 2 was 4 mil.

The above laminate of Control 1 and 2, and Examples 1 and 2 were tested with respect to oxygen as the corrosion gas as follows:

TABLE 2

Test Conditions:

| | |
|---|---|
| Test Gas | Oxygen |
| Test Gas Concentration | 100% $O_2$ |
| Test Gas Humidity | 90% RH |
| Test Gas Pressure | 760 mmHg |
| Test Temperature | 23.0 (° C.) 73.4 (° F.) |
| Carrier Gas | 98% $N_2$, 2% $H_2$ |
| Carrier Gas Humidity | 0% RH |

Test Results:

| Sample Identification | Oxygen Transmission Rate cc/(100 in$^2$/day) |
|---|---|
| 100% LDPE (Control) Example 1 | 122 |
| Oxygen Barrier Example 1 | 0.0239 |
| Oxygen Barrier Example 2 | 0.0199 |

The above laminates were analyzed on a MOCON Oxtran 2/21 instrument. The test standards that were utilized include ASTM D-3985, ASTM F-1927; DIN 53380, JS K-7126 and ISO CD 15105-2.

As apparent from Table 2, the transmission rate of oxygen with respect to Control 1, low density polyethylene was very high, i.e. 122. In contrast thereto, Example 1 was a very effective corrosion gas resistant laminate having an oxygen transmission rate of 0.0239 whereas Example 2 had an oxygen transmission rate of 0.0199. Thus, the laminates of the present invention resulted in an unexpected and synergistic decrease in the transmission rate of oxygen through the laminates of at least 5,000!

The above four laminates as set forth in Table 1 were also tested with respect to hydrogen sulfide as the corrosion gas as follows:

Test Procedure

Films were stretched over a 60 cc Teflon jar. The center portion of the jar cap was removed so the film would be exposed to the outside environment. The 60 cc Teflon jar has an inlet and outlet tube attached to the sides. The corrosion gases, $H_2S$ was connected to the tubes allowing a gas flow of 10 cc/min to go in and out of the jar on a continuous basis. The Teflon jar was placed inside an outer vessel and sealed. As the gases permeated through the laminate they were captured in the outer chamber having a probe located therein. The SPME (metal oxide coated silica fibers) located within the probe was exposed for 10 minutes to the headspace and then injected into a GC inlet for area count comparison to a known concentration standard. For hydrogen sulfide permeation values two connectors were added to the top of the outer vessel. One connector was attached to an Arizona Instrument Jerome 6314 H2S analyzer. As the Jerome pulled a sample from the headspace volume for analysis, this volume was replaced by allowing clean air filtered through a carbon bed to be drawn back into the vessel. The headspace was stirred prior to sampling to ensure a uniform sample.

Test Results

The noted 4 different laminates were tested with regard to hydrogen disulfide penetration over various periods of time and the results thereof are set forth in Table 3.

TABLE 3

| Exposure Time | | Permeation Concentration ppm $H_2S$ |
|---|---|---|
| Gas concentration: 100 ppm $H_2S$ Control 1 | | |
| Start | 0 min | BDL |
| | 16 hrs | 0.16 |
| | 24 hrs 10 min | 1.10 |
| | 40 hrs 40 min | 0.70 |
| | 51 hrs 55 min | 0.89 |
| | 195 hrs 50 min | 0.92 |
| | 205 hrs 5 min | 0.98 |
| | 226 hrs 20 min | 1.50 |
| | 245 hrs 55 min | 1.80 |
| | 249 hrs 55 min | 1.50 |
| | 269 hrs 45 min | 1.30 |
| | 273 hrs 30 min | 1.70 |
| Gas concentration: 100 ppm $H_2S$ Control 2 | | |
| Start | 0 min | BDL |
| | 16 hrs | 0.09 |
| | 24 hrs 15 min | 0.11 |
| | 40 hrs 35 min | 0.21 |
| | 52 hrs | 0.53 |
| | 195 hrs 55 min | 0.67 |
| | 205 hrs | 0.69 |
| | 226 hrs 10 min | 0.98 |
| | 246 hrs | 1.10 |
| | 250 hrs 10 min | 1.20 |
| | 269 hrs 55 min | 1.15 |
| | 273 hrs 50 min | 1.15 |
| Gas concentration: 100 ppm $H_2S$ Example 1 | | |
| Start | 0 min | BDL |
| | 16 hrs | 0.004 |
| | 24 hrs | 0.004 |
| | 40 hrs 50 min | 0.000 |
| | 51 hrs 45 min | 0.006 |
| | 195 hrs 45 min | 0.004 |
| | 205 hrs 15 min | 0.020 |
| | 226 hrs 15 min | 0.017 |
| | 245 hrs 15 min | 0.018 |
| | 249 hrs 45 min | 0.015 |
| | 269 hrs 30 min | 0.019 |
| | 272 hrs 30 min | 0.017 |
| Gas concentration: 100 ppm $H_2S$ Example 2 | | |
| Start | 0 min | BDL |
| | 16 hrs | BDL |
| | 24 hrs 5 min | BDL |
| | 40 hrs 45 min | BDL |
| | 51 hrs 50 min | BDL |
| | 196 hrs | BDL |
| | 205 hrs 10 min | 0.001 |
| | 226 hrs 30 min | 0.001 |
| | 245 hrs 50 min | BDL |
| | 250 hrs | BDL |
| | 269 hrs 50 min | BDL |
| | 273 hrs 35 min | BDL |

| Film Number | $H_2S$ value | Permeation Rate |
|---|---|---|
| Control 1 | 1.7 ppm | 5,712 cc/m$^2$/day |
| Control 2 | 1.15 | 3,864 cc/m$^2$/day |
| Example 1 | 0.017 | 57 cc/m$^2$/day |
| Example 2 | BDL | BDL |

(BDL means below detectable limits)

As apparent from the above table, the laminates of the present invention, i.e. Examples 1 and 2, gave unexpected and synergistic improvements with regard to the reduction of hydrogen sulfide gas penetration as well as reduction of permeation rates through the laminates in comparison to the Controls.

The same two Controls and the same two Examples a set forth in Table 1 were tested with regard to permeation by chlorine gas in nitrogen. When tested in the manner as set forth above with respect to the oxygen permeation test, results were obtained as set forth in Table 4. Briefly, the test method related to films being stretched over a 60 cc Teflon jar. The center portion of the jar cap was removed so the film would be exposed to the outside environment. The 60 cc Teflon jar has an inlet and outlet tube attached to the sides. The challenge gas, chlorine, was connected to the tubes allowing a gas flow of 15 cc/min to go in and out of the jar on a continuous basis.

The Teflon jar was placed inside an outer vessel and sealed. As the challenged compounds permeated through the membrane they were captured in the outer chamber.

To determine permeation values a Drager Tube, p/n 6728411, was inserted into the headspace area of the outer vessel. The Drager tube was specifically made to detect chlorine gas as a concentration of 0-5 ppm. As the sample pump drew air out of the outer vessel the volume was replaced by allowing clean air filtered through a carbon bed to be drawn back into the vessel.

The headspace was stirred prior to sampling to ensure a uniform sample.

TABLE 4

| | Break-through time | Equili-bration time | ppm Vol. | Dilu-tion | Total Run Time | Cl ppmV/m$^2$/day |
|---|---|---|---|---|---|---|
| Control 1 | 816 hrs. | 864 hrs | 0.25 ppm Vol. | 1120 cc | 1032 hrs | 0.025 |
| Control 2 | 180 hrs. | 227 hrs | 0.3 ppm Vol | 1120 cc | 984 hrs | 0.12 |
| Example 1 | BDL | BDL | BDL | 1120 cc | 984 hrs | BDL |
| Example 2 | BDL | BDL | BDL | 970 cc | 720 hrs | BDL |

The following eight examples were made and tested with respect to oxygen permeation. Examples 3, 7, and 9 did not contain any VCI additives therein, e.g. in the outer or inner layer, but the remaining examples, i.e. 4-6 and 8 and 10 did contain sodium nitrite as a VCI in the outer layer. The results of the oxygen permeability test with regard to Examples 3-10 were very low oxygen transmission rates, with the transmission rates of examples 4-6 and 8 and 10 containing a VCI therein having slightly lower oxygen transmission rates than Examples 3, 7, and 9 that contained no VIC. The actual oxygen transmission rates were very similar to that set, forth in Table 2 with respect to Examples 1 and 2. Thus, once again dramatically reduced and synergistic results were obtained with regard to the corrosive gas resistant laminates of the present invention.

Example 3

A three layer corrosive gas resistant laminate having no VCI additives. (FIG. 4).

A three layer tube was coextruded to form a 4 mil film. The tubing comprised:

An outer layer of a low linear low density polyethylene resin, e.g. Exxon 1001 series, blended with an extrudable tie layer resin anhydride modified LLDPE resin, e.g. Equistar Plexar PX3236.

A barrier layer of an ethylene vinyl alcohol copolymer, e.g. ET3803 Soarnol (38% mol % content).

An inner layer of a linear low density polyethylene resin, e.g. Exxon 1001 series, blended with an extrudable tie layer resin anhydride modified LLDPE resin, i.e. Equistar Plexar PX3236.

Example 4

A three layer corrosive gas resistant laminate having VCI additive(s) added to the inner layer (FIG. 4).

A three layer tube was coextruded to form a 4 mil film. The tubing comprised:

An outer layer of a linear low density polyethylene resin, e.g. Exxon 1001 series blended with an extrudable tie layer resin anhydride modified LLDPE resin, e.g. Equistar Plexar 3236.

A barrier layer of an ethylene vinyl alcohol copolymer, e.g. ET3803 Soarnol (38% mol % content).

An inner layer of a linear low density polyethylene resin, e.g. Exxon 1001 series, blended with an extrudable tie layer resin anhydride modified LLDPE resin, i.e. Equistar Plexar PX3236, and sodium nitrite.

Example 5

A three layer corrosive gas resistant laminate having VCI additive(s) added to the outer and inner layers (FIG. 4).

A three layer tube was coextruded to form a 4 mil film. The tubing comprised:

An outer layer of a linear low density polyethylene resin, e.g. Exxon 1001 series, blended with an extrudable tie layer resin anhydride modified LLDPE resin, e.g. Equistar Plexar 3236, and containing sodium nitrite.

A barrier layer of an ethylene vinyl alcohol copolymer, e.g. ET3803 Soarnol (38% mol % content).

An inner layer of a linear low density polyethylene resin, e.g. Exxon 1001 series, blended with an extrudable tie layer resin anhydride modified LLDPE resin, i.e. Equistar Plexar PX3236, and containing sodium nitrite.

Example 6

A three layer corrosive gas resistant laminate having VCI additive(s) added to the outer and inner layers (FIG. 4).

A three layer tube was coextruded to form a 4 mil film. The tubing comprised:

An outer layer of a linear low density polyethylene resin, e.g. Exxon 1001 series, blended with an extrudable tie layer resin anhydride modified LLDPE resin, e.g. Equistar Plexar 3236, and containing sodium nitrite.

A barrier layer of an ethylene vinyl alcohol copolymer, e.g. ET3803 Soarnol (38% mol % content).

An inner layer of a linear low density polyethylene resin, e.g. Exxon 1001 series, blended with an extrudable tie layer resin anhydride modified LLDPE resin, i.e. Equistar Plexar PX3236, and containing sodium nitrite.

Example 7

A five layer corrosive gas resistant laminate having no VCI additive(s) therein (FIG. 2).

A five layer tube was coextruded to form a 4 mil film. The tubing comprised:

An outer layer of a linear low density polyethylene resin, e.g. Exxon 1001 series.

An extrudable tie layer resin anhydride modified LLDPE resin, e.g. Equistar Plexar 3236.

A barrier layer of an ethylene vinyl alcohol copolymer, e.g. ET3803 Soarnol (38% mol % content).

An extrudable tie layer resin anhydride modified LLDPE resin, i.e. Equistar Plexar PX3236.

An inner layer of a linear low density polyethylene resin, e.g. Exxon 1001 series.

Example 8

A five layer corrosive gas resistant laminate having VCI additive(s) added to the inner layer (FIG. 2).

A five layer tube was coextruded to form a 4 mil film. The tubing comprised:

An outer layer of a linear low density polyethylene resin, e.g. Exxon 1001 series.

An extrudable tie layer resin anhydride modified LLDPE resin, e.g. Equistar Plexar 3236.

A barrier layer of an ethylene vinyl alcohol copolymer, e.g. ET3803 Soarnol (38% mol % content).

An extrudable tie layer resin anhydride modified LLDPE resin, i.e. Equistar Plexar PX3236.

An inner layer of a linear low density polyethylene resin, e.g. Exxon 1001 series, and sodium nitrite.

Example 9

A five layer corrosive gas resistant laminate having no VCI additive(s) therein (FIG. 2).

A five layer tube was coextruded to form a 4 mil film. The tubing comprised:

An outer layer of a linear low density polyethylene resin, e.g. Exxon 1001 series.

An extrudable tie layer resin anhydride modified LLDPE resin, e. Equistar Plexar 3236.

A barrier layer of an ethylene vinyl alcohol copolymer, e.g. ET3803 Soarnol (38% mol % content).

An extrudable tie layer resin anhydride modified LLDPE resin, i.e. Equistar Plexar PX3236.

An inner layer of a linear low density polyethylene resin, e.g. Exxon 1001 series.

Example 10

A five layer corrosive gas resistant laminate having VCI additive(s) in the inner and outer layers (FIG. 2).

A five layer tube was coextruded to form a 4 mil film. The tubing comprised:

An outer layer of a linear low density polyethylene resin, e.g. Exxon 1001 series, and sodium nitrite.

An extrudable tie layer resin anhydride modified LLDPE resin, e.g. Equistar Plexar 3236.

A barrier layer of an ethylene vinyl alcohol copolymer, e.g. ET3803 Soarnol (38% mol % content).

An extrudable tie layer resin anhydride modified LLDPE resin, Equistar Plexar PX3236.

An inner layer of a linear low density polyethylene resin, e.g. Exxon 1001 series, and sodium nitrite.

As noted above, each of Examples 3-10 gave surprisingly and synergistic low oxygen permeability values, similar to the values set forth in Examples 1 and 2 of Table 2.

The corrosive gas resistant laminates of the present invention can be utilized wherever metals are desired to be protected against corrosive gases. Thus, laminates can be utilized as wraps, protective covers, enclosures, and the like with respect to various metals and alloys. End uses include the protection of various automotive parts and components, various machine, automotive parts and components, various marine parts and components, as well as numerous different types of electronic devices as for example printed circuits, circuit boards, unpopulated boards, memory discs such as silver plated memory discs, and the like. Various metals per se as in the form as ingots, bars, chips, powder and the like can also be protected by the laminates of the present invention. Still other uses relate to the protection of various military and aerospace alloys and components such as various magnesium alloy parts, coils, and the like. Other military and aerospace end uses include the protection of various airplane components such as landing gears, engine components, body and fuselage components, various wing components, and other military items such as artillery and rifle components, control modules, and the like.

Since as noted above, the purpose of the corrosive gas resistant laminates of the present invention is to protect various substrates, that is metals from corrosion and since the various layers, particularly the outer layer contains various functional additives therein such as volatile corrosion inhibitors, biocides, flame-retardants, and the like, it is imperative that the laminates of the present invention not be utilized to protect various foods such as grains, vegetables, fruits, dairy products, meats, and fish. Such use can be detrimental thereto particularly to persons consuming such foods. Thus, the laminates are not used as food wraps, packaging, bagging, or any other similar function with respect to foods and medicines.

While in accordance with the patent statutes the best mode and preferred embodiment have been set forth, the scope of the invention is not intended to be limited thereto, but only by the scope of the attached claims.

What is claimed is:

1. A corrosive gas resistant laminate, comprising:
    a laminate capable of wrapping and forming a closed space about a metal surface and capable of preventing metal corrosive gases comprising $H_2S$, $SO_2$, and halogen gases from corroding said metal surface, and wherein said laminate is not utilizable as a food wrap;
    said laminate comprising:
    at least one outer thermoplastic polymer layer comprising a VCI;
    at least one corrosive gas resistant barrier layer;
    at least one tie layer that is compatible with said outer layer and said barrier layer and is located between said outer layer and said barrier layer;
    wherein said at least one tie layer, independently, comprises a polyacrylate or a polymethacrylate wherein the ester portion thereof has from 1 to about 12 carbon atoms, or a blend of said polyacrylate or said polymethacrylate with a polyolefin; a polyanhydride or a polymaleic anhydride; or a copolymer of said polyanhydride or said polymaleic anhydride with an olefin, with ethylvinylacetate, or with ethylene acrylate;
    wherein said laminate has an $H_2S$ transmission rate of less than about 200 cc/100 m$^2$/day; and
    wherein said VCI is capable of evaporating and filling said closed space.

2. The corrosive gas resistant laminate of claim 1, wherein said outer layer comprises a polyolefin or a copolymer thereof; a copolymer of ethylene-ethylacrylate or ethylene-methylacrylate; a polymer derived from a diene, or a copolymer derived from a diene; polystyrene; a halocarbon containing polymer; a heterochain thermoplastic; a polysulfide; a polyphthalamide; a polyurethane; a polyamide; a polyester; or any combination of the preceding;
    wherein said corrosive gas resistant barrier layer comprises a polyvinyl alcohol or an alkylene-vinyl alcohol copolymer, or a blend of either with another polymer; or a carbon monoxide-containing ethylene polymer blended with said polyvinyl alcohol polymer or said polyalkylene-vinyl alcohol copolymer; a polyamide, or a polyamide copolymer, or a blend of either with another polymer; a polyvinylacetate polymer, or a polyvinylacetate copolymer, or blend of either with another polymer; or a polyvinylidene chloride, or a copolymer thereof.

3. The corrosive gas resistant laminate of claim 1, wherein said outer layer polymer comprises polyethylene including various low and high density polyethylenes, polypropylene, and copolymers thereof, an ethylene-ethyl acrylate copolymer, an ethylene methyl acrylate copolymer, a copolymer of acrylonitrile-butadiene-styrene (ABS), a copolymer of methyl methacrylate-styrene, polybutyldiene, polychloroprene, a copolymer of butadiene and styrene, polychlorotrifluoroethylene, polytetrafluoroethylene, a fluorinated ethylene polypropylene copolymer, polyvinylchloride, polyvinylidene chloride, polyvinylidene fluoride, a blend of polyethylene and polytetrafluoroethylene, a copolymer of melamine formaldehyde, a polyurethane, a polyamide, or a polyester, or any combination thereof;

wherein said VCI is a triazole or a derivative thereof; a benzoate or a salt of benzoic acid; a carbonate; a phosphate; an alkali metal molybdate, a dimolybdate, an amine molybdate, or a salt thereof; an alkali dibasic acid salt; an organic nitrite, or an alkali metal nitrite; at least one $C_6$ to $C_{12}$ aliphatic monocarboxylic acid, at least one $C_6$ to $C_{12}$ aliphatic dicarboxylic acid, or at least one primary aromatic amide; or any combination of the preceding; wherein the amount of said VCI is from about 0.25 to about 10 parts by weight for every 100 parts by weight of said outer layer;

wherein said tie layer comprises said acrylate or said methacrylate blended with a polyolefin; said polymeric anhydride or said polymaleic anhydride; or said copolymer of said polymeric anhydride or of said polymaleic anhydride with either an olefin or with an ethyl-vinyl acetate; or any combination of the preceding;

wherein said corrosive gas resistant barrier layer comprises a polyvinyl alcohol or an alkylene-vinyl alcohol copolymer, or a blend of either with another polymer; or a carbon monoxide-containing ethylene polymer blended with said polyvinyl alcohol polymer or said polyalkylene-vinyl alcohol copolymer; a polyamide, or a polyamide copolymer, or a blend of either with another polymer; a polyvinylacetate polymer, or a polyvinylacetate copolymer, or blend of either with another polymer; or a polyvinylidene chloride, or a copolymer thereof.

4. The corrosive gas resistant laminate of claim 3, wherein said laminate has an oxygen transmission rate of less than about 50 cc/100 m²/day.

5. The corrosive gas resistant laminate of claim 3, wherein said VCI is benzotriazole, tolytriazole, ammonium benzoate, cyclohexylammonium benzoate, said salt of benzoic acid, said alkali metal molybdate, said dimolybdate, an aliphatic or aromatic amine salt molybdate having a total of from about 3 to about 30 carbon atoms, or said alkali metal nitrite; or any combination thereof;

wherein said corrosive gas resistant barrier layer polymer contains a phenol additive; and wherein said laminate has an H₂S transmission rate of less than about 100 cc/100 m²/day.

6. The corrosive gas resistant laminate of claim 5, wherein said outer layer comprises said polyethylene, said polyester, or said polyamide, or any combination thereof;

wherein said VCI is said alkali metal nitrite and wherein the amount of said nitrite is from about 0.4 to about 3.0 parts by weight per 100 parts by weight of said outer layer;

wherein said tie layer is said polymeric anhydride, an ethylene-maleic anhydride copolymer, or a copolymer of propylene-maleic anhydride, or any combination thereof;

wherein said corrosive gas resistant barrier layer is a copolymer of said ethylene-vinyl alcohol wherein the amount of ethylene in said copolymer is from about 30 to about 45 mole percent; or said polyvinylidene chloride, or a copolymer thereof with vinyl chloride, acrylate, or acrylonitrile;

wherein said corrosive gas resistant barrier layer phenol additive is 2-hydroxy-4-octoxybenzophenone, 2-hydroxy-4-methoxybenzophenone, 2,4-dihydroxybenzophenone, octyl 3-(3',5'-di-t-butyl-4-hydroxy)phenyl propionate, 2(2'-hydroxy-3',5' di-tert-amyl)phenyl-benzotriazole, tertiary butyl salicylate, butylhydroquinone, or any combination thereof, and wherein the amount of said phenol is from about 0.7 to about 5 parts by weight per 100 total parts by weight of said barrier layer; and wherein the total thickness of said at least one or more outer polymer layers is from about 65 to about 93%, wherein the total thickness of said at least one or more tie layers is from about 3 to about 20%, and wherein the total thickness of said at least one or more corrosive barrier layers is from about 2 to about 15% based upon the total thickness (100%) of said corrosive gas resistant laminate.

7. A corrosive gas resistant laminate, comprising:

a laminate capable of wrapping and forming a closed space about a metal surface and preventing metal corrosive gases comprising H₂S, SO₂, and halogen gases from corroding said metal surface, and wherein said laminate is not utilizable as a food wrap;

said laminate comprising:

at least one corrosive gas resistant barrier layer;

at least one outer layer, said outer layer having at least one tie layer compound blended therein that is compatible with said outer layer material and said barrier layer;

wherein said each tie layer compound, independently, comprises a polyacrylate or a polymethacrylate wherein the ester portion thereof has from 1 to about 12 carbon atoms, or a blend of said polyacrylate or said polymethacrylate with a polyolefin; a polyanhydride or a polymaleic anhydride; or a copolymer of said polyanhydride or said polymaleic anhydride with an olefin, with ethylvinylacetate, or with ethylene acrylate;

wherein said laminate has an H₂S transmission rate of less than about 200 cc/100 m²/day; and including at least one VCI compound in said outer layer, and wherein said VCI is capable of evaporating and filling said closed space.

8. The corrosive gas resistant laminate of claim 7, wherein said outer layer comprises a polyolefin or a copolymer thereof; a copolymer of ethylene-ethylacrylate or ethylene-methylacrylate; a polymer derived from a diene, or a copolymer derived from a diene; polystyrene; a halocarbon containing polymer; a heterochain thermoplastic; a polysulfide, a polyphthalamide; a polyurethane; a polyamide; a polyester, or any combination of the preceding; and wherein said corrosive gas resistant barrier layer comprises said polyvinyl alcohol or an alkylene-vinyl alcohol copolymer, or a blend of either with another polymer, or a carbon monoxide-containing ethylene polymer blended with said polyvinyl alcohol polymer or said polyalkylene-vinyl alcohol copolymer, a polyamide, or a polyamide copolymer, or a blend of either with another polymer; a polyvinylacetate polymer or a polyvinylacetate copolymer, or blend of either with another polymer; or a polyvinylidene chloride, or a copolymer thereof.

9. The corrosive gas resistant laminate of claim 8, wherein said outer layer comprises a polyethylene, said polyester, or said polyamide, or any combination thereof;
wherein said outer layer tie compound is said polymeric anhydride, an ethylene-maleic anhydride copolymer, or a copolymer of propylene maleic-anhydride, or any combination thereof;
wherein said corrosive gas resistant barrier laminate is a copolymer of ethylene-vinyl alcohol wherein the amount of ethylene in said copolymer is from about 30 to about 45 mole percent;
wherein said VCI is benzotriazole, tolytriazole, ammonium benzoate, cyclohexylammonium benzoate, a salt of benzoic acid, an alkali metal molybdate, a dimolybdate, an aliphatic or aromatic amine salt molybdate having a total of from about 3 to about 30 carbon atoms, or an alkali metal nitrite; or any combination thereof; and
wherein said laminate has an oxygen transmission rate of less than about 50 cc/100 m$^2$/day.

10. The corrosive gas resistant laminate of claim 8, including at least one inner layer, said inner layer having at least one tie layer compound blended therein that is compatible with said inner layer material and said barrier layer material;
wherein said inner layer comprises a polyolefin or a copolymer thereof; a copolymer of ethylene-ethylacrylate or ethylene-methylacrylate; a polymer derived from a diene, or a copolymer derived from a diene; polystyrene; a halocarbon polymer; a heterochain thermoplastic; a polysulfide; a polyphthalamide; a polyurethane; a polyimide; a polyester; or any combination of the preceding;
wherein said inner layer tie compound independently comprises a polyacrylate or a polymethacrylate wherein the ester portion thereof has from 1 to about 12 carbon atoms, or a blend of said polyacrylate or said polymethacrylate with a polyolefin; a polyanhydride or a polymaleic anhydride; or a copolymer of said polyanhydride or said polymaleic anhydride with an olefin, with ethylvinylacetate, or with ethylene acrylate; and
wherein said inner layer contains at least one VCI compound therein.

11. The corrosive gas resistant laminate of claim 10, wherein said outer layer is free of any VCI compound, wherein said, inner layer comprises a polyethylene, said polyester, or said polyamide, or any combination thereof;
wherein said inner layer tie compound is said polymeric anhydride, an ethylene-maleic anhydride copolymer, or a copolymer of propylene maleic anhydride, or any combination thereof;
wherein said inner layer VCI compound is benzotriazole, tolytriazole, ammonium benzoate, cyclohexylammonium benzoate, a salt of benzoic acid, an alkali metal molybdate, a dimolybdate, an aliphatic or aromatic amine salt molybdate having a total of from about 3 to about 30 carbon atoms, or an alkali metal nitrite; or any combination thereof;
wherein the total thickness of said at least one or more outer polymer layers and/or said one or more polymer inner layers including any tie layer compound therein is from about 75% to about 98%, and wherein the total thickness of said one or more corrosive barrier layers is from about 2% to about 25% based upon the total thickness (100%) of said corrosive gas resistant laminate; and
wherein said corrosive gas resistant barrier layer polymer is said polyvinyl alcohol, a copolymer of ethylene-vinyl alcohol, said polyamide, said carbon monoxide-containing ethylene polymer blended with said polyvinyl alcohol or said polyvinyl alcohol copolymer; said polyvinylidene chloride or said polyvinlidene copolymer, or any combination thereof.

12. The corrosive gas resistant laminate of claim 9, wherein said VCI compound is said alkali metal nitrite and wherein the amount of said nitrite is from about 0.4 to about 3.0 parts by weight per 100 parts by weight of said inner layer.

13. The corrosive gas resistant laminate of claim 11, wherein said VCI is said alkali metal nitrite and wherein the amount of said nitrite is from about 0.4 to about 3.0 parts by weight per 100 parts by weight of said outer layer.

14. A corrosive gas resistant laminate for protecting metal against corrosion, comprising:
a laminate capable of wrapping and forming a closed space about a metal surface and preventing metal corrosive gases comprising $H_2S$, $SO_2$, and halogen gases from corroding said metal surface, and wherein said laminate is not utilizable as a food wrap;
said laminate comprising:
at least one outer layer that is a corrosive gas resistant barrier layer;
at least inner layer comprising a VCI;
at least one tie layer that is compatible with said outer barrier layer and said inner layer; and wherein each said tie layer, independently, comprises a polyacrylate or a polymethacrylate wherein the ester portion thereof has from 1 to about 12 carbon atoms, or a blend of said polyacrylate or said polymethacrylate with a polyolefin; a polyanhydride or a polymaleic anhydride; or a copolymer of said polyanhydride or said polymaleic anhydride with an olefin, with ethylvinylacetate, or with ethylene acrylate;
wherein said laminate has an $H_2S$ transmission rate of less than about 200 cc/100 m$^2$/day; and
wherein said VCI is capable of evaporating and filling said closed space.

15. The corrosive gas resistant laminate of claim 14, wherein said corrosive gas resistant barrier layer comprises a polyvinyl alcohol or an alkylene-vinyl alcohol copolymer, or a blend of either with another polymer; or a carbon monoxide-containing ethylene polymer blended with said polyvinyl alcohol polymer or said polyalkylene-vinyl alcohol copolymer; a polyamide, or a polyamide copolymer, or a blend of either with another polymer; a polyvinylacetate polymer, or a polyvinylacetate copolymer, or blend of either with another polymer; or a polyvinylidene chloride, or a copolymer thereof.

16. The corrosive gas resistant laminate of claim 15, wherein said corrosive gas resistant barrier layer polymer is said polyvinyl alcohol, a copolymer of ethylene-vinylalcohol, said polyamide, said carbon monoxide-containing ethylene polymer blended with said polyvinyl alcohol or said polyvinyl alcohol copolymer; said polyvinylidene chloride or said polyvinylidene copolymer, or any combination thereof;
wherein said inner polymer layer comprises polyethylene including various low and high density polyethylenes, polypropylene, and copolymers thereof, an ethylene-ethyl acrylate copolymer, an ethylene methyl acrylate copolymer, a copolymer of acrylonitrile-butadiene-styrene (ABS), a copolymer of methyl methacrylate-styrene, polybutyldiene, polychloroprene, a copolymer of butadiene and styrene, polychlorotrifluoroethylene, polytetrafluoroethylene, a fluorinated ethylene polypropylene copolymer, polyvinylchloride, polyvinylidene chloride, polyvinylidene fluoride, a blend of polyethylene and polytetrafluoroethylene, a copolymer of melamine formaldehyde, a polyurethane, a polyamide, or a polyester, or any combination thereof;

wherein said VCI is a triazole or a derivative thereof; a benzoate or a salt of benzoic acid; a carbonate; a phosphate; an alkali metal molybdate, a dimolybdate, an amine molybdate, or a salt thereof; an alkali dibasic acid salt; an organic nitrite, or an alkali metal nitrite; at least one $C_6$ to $C_{12}$ aliphatic monocarboxylic acid, at least one $C_6$ to $C_{12}$ aliphatic dicarboxylic acid, or at least one primary aromatic amide; or any combination of the preceding; wherein the amount of said VCI is from about 0.25 to about 10 parts by weight for every 100 parts by weight of said outer layer; and wherein said tie layer comprises said acrylate or said methacrylate blended with an polyolefin; said polymeric anhydride or said polymaleic anhydride; or said copolymer of said polymeric anhydride or of said polymaleic anhydride with either an olefin or with an ethyl-vinyl acetate; or any combination of the preceding.

17. The corrosive gas resistant laminate of claim 16, wherein said corrosive gas resistant barrier layer is a copolymer of said ethylene-vinyl alcohol wherein the amount of ethylene in said copolymer is from about 30 to about 45 mole percent; or said polyvinylidene chloride, or a copolymer thereof with vinyl chloride, an acrylate, or acrylonitrile;

wherein said inner layer comprises said polyethylene, said polyester, or said polyamide, or any combination thereof, wherein said inner layer VCI is benzotriazole, tolytriazole, ammonium benzoate, cyclohexylammonium benzoate, a salt of benzoic acid, an alkali metal molybdate, said dimolybdate, an aliphatic or aromatic amine salt molybdate having a total of from about 3 to about 30 carbon atoms, or said alkali metal nitrite; or any combination thereof;

wherein said tie layer is located between said outer corrosion gas resistant barrier layer and said inner polymer layer, and wherein said tie layer is said polymeric anhydride, an ethylene-maleic anhydride copolymer, or a copolymer or a copolymer of propylene maleic anhydride, or any combination thereof; and wherein said laminate has an $H_2S$ transmission rate of less than about 100 cc/100 $m^2$/day.

18. The corrosive gas resistant laminate of claim 17, wherein the total thickness of said at least one or more corrosion gas resistant barrier layers is from about 2 to 15%, wherein the total thickness of said one or more inner polymer layers is from about 65 to about 93%, and wherein the total thickness of said one or more tie layers is from about 3 to about 20% based upon the total thickness (100%) of said corrosive gas resistant laminate.

* * * * *

UNITED STATES PATENT AND TRADEMARK OFFICE
CERTIFICATE OF CORRECTION

| | | |
|---|---|---|
| PATENT NO. | : 8,557,373 B2 | Page 1 of 1 |
| APPLICATION NO. | : 13/630469 | |
| DATED | : October 15, 2013 | |
| INVENTOR(S) | : Donald Kubik and Barbara Nygaard | |

It is certified that error appears in the above-identified patent and that said Letters Patent is hereby corrected as shown below:

In the Claims:

Claim 9, column 21, line 12: should read "propylene-maleic"

Claim 9, column 21, line 12: delete "-" between "maleic" and "anhydride"

Claim 11, column 22, line 8: insert --,-- between "chloride" and "or"

Signed and Sealed this
Seventeenth Day of December, 2013

Margaret A. Focarino
*Commissioner for Patents of the United States Patent and Trademark Office*